OXYMETHYLENE COPOLYMERS

Frank M. Berardinelli, South Orange, and Robert W. Stevenson, Plainfield, N.J., assignors to Celanese Corporation of America, New York, N.Y., a corporation of Delaware
No Drawing. Filed June 22, 1959, Ser. No. 821,719
14 Claims. (Cl. 260—67)

This invention relates to novel copolymers of high thermal stability and particularly to copolymers of trioxane.

Polyoxymethylene polymers, having recurring

units have been known for many years. They may be prepared by the polymerization of anhydrous formaldehyde or by the polymerization of trioxane which is a cyclic trimer of formaldehyde.

Trioxane may be polymerized to produce a moldable polymer of high thermal stability, particularly in the presence of a boron fluoride-containing catalyst such as a boron fluoride coordinate with an organic compound in which oxygen or sulfur is the donor atom.

It has now been found that useful moldable polymers comprising oxymethylene groups and 2-chloromethyl oxyethylene groups

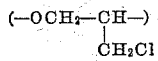

may be obtained by copolymerizing trioxane with epichlorohydrin or 4-chloromethyl-1,3-dioxolane.

The preferred catalysts used in the preparation of the desired copolymers are the boron fluoride coordinate complexes with organic compounds in which oxygen or sulfur is the donor atom and boron trifluoride gas itself.

The coordinate complexes of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. Boron fluoride dibutyl etherate is also highly desirable. The boron fluoride complexes which may be used include complexes with ethanol, with methanol, with propanol, with butanol, with methyl acetate, with ethyl acetate, with phenyl acetate, with benzoic acid, with acetic anhydride, with acetone, with methyl ethyl ketone, with dimethyl ether, with methylphenyl ether, with acetaldehyde, with chloral, with dimethyl sulfide and with ethyl mercaptan.

Coordinate complexes of boron fluoride with water, such as boron fluoride monohydrate, boron fluoride dihydrate and boron fluoride trihydrate may also be used.

The coordinate complex of boron fluoride should be present in the polymerization zone in an amount such that its boron fluoride content is between about 0.001 and about 1.0 weight percent based on the weight of trioxane and comonomer in the polymerization zone. Preferably, amounts between about 0.003 and about 0.1 weight percent should be used.

While it is not desired to be bound by any theory, it is believed that epichlorohydrin, under the polymerization conditions, opens its ring between a carbon atom and the oxygen atom to produce a 2-chloromethyl oxyethylene group and that 4-chloromethyl-1,3 dioxolane opens its ring between a carbon atom and an oxygen atom to produce a linear structure comprising an oxymethylene group linked to a 2-chloromethyl oxyethylene group.

The trioxane and comonomer in the reaction zone are preferably anhydrous or substantially anhydrous. Small amounts of moisture, such as may be present in commercial grade feed materials or may be introduced by contact with atmospheric air will not prevent polymerization, but should be removed for best yields.

In one embodiment of this invention the trioxane is polymerized in its molten state with the comonomer and catalyst dissolved therein. The preferred temperature for such polymerization is between about 0° and about 100° C. The period of reaction for such polymerization may vary from about 2 minutes to about 72 hours. Pressures from subatmospheric to about 100 atmospheres, or more, may be used, although atmospheric pressure is preferred.

In another embodiment of this invention, the trioxane, comonomer and catalyst are dissolved in a common anhydrous solvent, such as cyclohexane, and permitted to react. The temperature for solution polymerization of this type may vary from about 10° C. to about 85° C. The period of reaction in such polymerization may vary from about ½ hour to about 72 hours. To obtain polymers of exceptionally high molecular weight it is desirable to initiate the polymerization in solution and to then drop the temperature so that most of the trioxane precipitates and to complete the polymerization in solid phase.

In the polymers of this invention, the 2-chloromethyl oxyethylene groups will be present in weight proportions between about 0.1 and 40 weight percent based on the weight of total polymer. Since the chlorine-containing comonomer combines vigorously with itself, it may be desirable to add at least a portion of the comonomer after the polymerization has initiated in order to avoid depletion thereof before the completion of the polymerization.

In producing the copolymers the weight ratio of the chlorine-containing comonomer to the trioxane may vary from about 2 to about 0.005 part of comonomer per part of trioxane in the reaction zone with the higher ratios being associated with delayed addition, as described above. Preferably, the weight ratio may vary from about 1 to about 0.01 part of comonomer per part of trioxane.

In addition to the oxymethylene and 2-chloromethyl oxyethylene groups, the polymer of this invention may comprise other recurring structural groups and particularly oxyalkylene groups having at least two carbon atoms. Oxyethylene groups are particularly desirable and may be incorporated into the polymer structure by including in the reactant mixture the desired amount of a cyclic ether having two adjacent carbon atoms, such as ethylene oxide or dioxolane. A suitable range of proportions for incorporating such a cyclic ether in the reaction mixture is between about 1 and 100 weight percent, based on the weight of trioxane, with higher proportions being associated with delayed addition. In the polymer, oxyethylene groups may suitably comprise between about 0.1 and 40 weight percent of the polymer. The combined weight of oxyethylene and 2-chloromethyl oxyethylene groups will generally not exceed 50% of the weight of the polymer.

Upon completion of the polymerization reaction where a relatively large amount of catalyst has been used it is desirable to neutralize the activity of the catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application S. No. 718,147, filed February 28, 1958, by Donald E. Hudgin and Frank M. Berardinelli.

EXAMPLE I

A solution of 392 grams of trioxane, 168 grams of cyclohexane and 9.8 grams of epichlorohydrin was heated at 60° C. and 0.12 ml. of boron fluoride dibutyletherate in 3.0 ml. of cyclohexane was added. The reaction mixture was maintained at 60-61° C. for 2¾ hours, after which it was cooled to 50° C. and 1 ml. of tributyl amine in 300 ml. of acetone was added. The polymer was filtered off, washed three times with acetone and dried at 60-65° C. 260 grams of polymer were obtained. A sample of the polymer, combined with 2 weight percent of 2,2′-methylene bis (4-methyl-6-tertiary butyl phenol) as a stabilizer, was molded into a tough disc at 190° C. for four minutes.

EXAMPLES II TO XII

A series of polymerization reactions were run in which cyclohexane constituted 30 weight percent of the total charge. The trioxane and initial epichlorohydrin were dissolved in 91% of the cyclohexane and heated at 60° C. for about ½ hour. The catalyst (boron fluoride dibutyl etherate), dissolved in the remaining 9% of the total cyclohexane was then added. Additional epichlorohydrin was added (except in Example V) when the polymerization had progressed just beyond the point of incipient cloudiness of the reaction mixture. The period of addition of the delayed epichlorohydrin was 90 minutes at a roughly uniform rate of addition, except in those examples where the total reaction time was shorter.

After completion of the reaction period, 50 ml. of acetone was added to the mixture and stirred for a few minutes. The material was filtered and subjected to three cycles of slurrying in acetone and filtration. The polymer powder was dried overnight in a circulating air oven at a temperature less than 100° C.

The reaction proportions, reaction time and temperature, and the melting point, chlorine content and oxymethylene content of the polymers are shown in the following table:

Table I

| Example No. | g. Trioxane | g. Epichlorohydrin Initial | g. Epichlorohydrin Delayed | Reaction Time (Hrs.) | Wt. Percent Catalyst | Reaction Temp. (° C.) | M. Pt. (° C.) | Percent Cl | Percent Oxymethylene |
|---|---|---|---|---|---|---|---|---|---|
| II | 160 | 5 | 31 | 3 | 0.021 | 60-45 | 112-130 | 6.57 | 82.9 |
| III | 180 | 2 | 18 | 1 | 0.021 | 60-45 | 151-165 | 2.45 | 93.6 |
| IV | 90 | 2 | 8 | ½ | 0.021 | 60-45 | 149-158 | 2.62 | 93.2 |
| V | 180 | 6 | --- | ⅙ | 0.021 | (a) | 165-173 | 0.85 | 97.8 |
| VI | 90 | 3 | 7 | 2 | 0.01 | 60-45 | 129-147 | 4.55 | 88.1 |
| VII | 180 | 3 | 6 | 1½ | 0.021 | 45 | 106-138 | 4.66 | 87.9 |
| VIII | 180 | 4 | 8.4 | 1½ | 0.01 | 45 | 164-176 | 0.82 | 97.8 |
| IX | 180 | 2.6 | 17.4 | 1½ | 0.01 | 50 | 160-179 | 0.52 | 98.6 |
| X | 180 | 2.4 | 4 | ⅓ | 0.01 | 45 | 167-185 | 0.80 | 97.9 |
| XI | 180 | 2 | 17 | 2⅔ | 0.007 | 50 | 153-173 | 1.77 | 95.4 |
| XII | 180 | ¼ | 19¾ | 2½ | 0.005 | 52 | 123-153 | 5.17 | 86.5 |

ᵃ Temperature rose by exothermic heat of reaction to a maximum of 99° C.

EXAMPLE XIII

To a three-necked 500 ml. flask equipped with a stirrer and dropping funnel were charged 180 grams trioxane, 5 grams dioxolane, and 80 grams of cyclohexane. Provision was made so that 15 grams of 4-chloromethyl-1,3-dioxolane could later be introduced to the reaction mixture from a dropping funnel. The flask charge was brought to 55° C. and 0.05 ml. of boron trifluoride-dibutyl etherate in 8 grams of cyclohexane was added. After a half-hour induction period, the flask was heated to 59° and the polymerization had begun. The addition of the comonomer, 4-chloromethyl-1,3-dioxolane, was begun at this time and continued over a 35 minute period. Additional catalyst, 0.06 ml. boron trifluoride in 8 ml. cyclohexane was added at this time. The reaction was self-sustaining at 60-65° for the next half hour. After standing overnight, the polymer was washed successively with tributylamine in methanol, methanol, and hot water. The melting range of the polymer was 164-169° C. and the I.V. as measured in 0.1% solution in 98 parts p-chlorophenol and 2 parts α-pinene was 0.74. The polymer analysis gave a value of 0.88% chlorine by weight indicating a 2-chloromethyl oxyethylene content of about 2.3% in the terpolymer.

EXAMPLE XIV

To a three-necked flask equipped with stirrer and dropping funnel were charged 180 grams of trioxane, 100 ml. of cyclohexane, and the temperature brought to 56° C. There was added 0.029 ml. of boron trifluoride dibutyl etherate in 5 ml. of cyclohexane, and at the same time the addition of 20 grams of 4-chloromethyl-1,3-dioxolane was begun from the dropping funnel. The addition of the comonomer at a uniform rate required 86 minutes, during which time the flask temperature was maintained at 56-60° by means of external heating. The mixture was then kept at 50° overnight, after which time the polymer was recovered. After stirring for 15 minutes each with five ml. of tributylamine in methanol, methanol, and hot water (twice), the polymer was dried at 70°. The melting point of the polymer was 168-173° C. Chlorine analysis indicated 1.13% chlorine by weight, or about 2.9% of 2-chloromethyl oxyethylene units in the polymer by weight.

It is to be understood that the foregoing detailed description is given merely by way of illustration and that many variations may be made therein without departing from the spirit of our invention.

Having described our invention what we desire to secure by Letters Patent is:

1. A copolymer consisting essentially of recurring oxymethylene groups and recurring 2-chloromethyl oxyethylene groups.

2. A copolymer consisting essentially of recurring oxymethylene groups, recurring oxyethylene groups and recurring 2-chloromethyl oxyethylene groups.

3. A copolymer consisting essentially of recurring oxymethylene groups and 0.1 to 40 weight percent of recurring 2-chloromethyl oxyethylene groups.

4. A copolymer consisting essentially of recurring oxymethylene groups, 0.1 to 40 weight percent of recurring 2-chloromethyl oxyethylene groups and 0.1 to 40 weight percent of recurring oxyethylene groups with the combined weight of 2-chloromethyl oxyethylene groups and oxyethylene groups not exceeding 50 weight percent of the polymer.

5. A method of preparing a moldable copolymer which comprises copolymerizing trioxane and from 0.01 to 1 part by weight of a comonomer of the group consisting of epichlorohydrin and 4-chloromethyl-1,3-dioxolane per part of trioxane.

6. A method of preparing a moldable copolymer which comprises copolymerizing trioxane and from 0.01 to 1 part by weight of epichlorohydrin per part of trioxane.

7. The method of claim 5 wherein said polymerization is carried out in the presence of a catalyst comprising a boron fluoride complex with an organic compound in which oxygen is the donor atom.

8. The method of claim 5 wherein said polymerization is carried out in the presence of a catalyst comprising gaseous boron fluoride.

9. The method of claim 5 wherein at least a portion of the epichlorohydrin is added to the reaction zone after polymerization has been initiated.

10. A method of preparing a moldable copolymer which comprises copolymerizing trioxane, between 1 and 100 weight percent of a comonomer of the group consisting of epichlorohydrin and 4-chloromethyl-1,3-dioxolane and between 1 and 100 weight percent of a second comonomer of the group consisting of ethylene oxide and dioxolane, both percentage ranges based on the weight of trioxane.

11. A method of preparing a moldable copolymer which comprises copolymerizing trioxane and from 0.01 to 1 part by weight of a comonomer of the group consisting of epichlorohydrin and 4-chloromethyl-1,3-dioxolane per part of trioxane at a temperature between 0° and 100° C. in the presence of a catalyst of the group consisting of gaseous boron fluoride, boron fluoride coordinate complexes with water, and boron fluoride coordinate complexes with organic compounds in which the donor atom is selected from the group consisting of oxygen and sulfur.

12. The method of claim 11 wherein said polymerization is carried out at a temperature between about 0° and 100° C. in the presence of a catalyst of the group consisting of gaseous boron fluoride, boron fluoride coordinate complexes with water, and boron fluoride coordinate complexes with organic compounds in which the donor atom is selected from the group consisting of oxygen and sulfur.

13. A copolymer of trioxane and a comonomer of the group consisting of epichlorohydrin and 4-chloromethyl-1,3-dioxolane.

14. A copolymer of trioxane, a comonomer of the group consisting of epichlorohydrin and 4-chloromethyl-1,3-dioxolane and a second comonomer of the group consisting of ethylene oxide and dioxolane.

References Cited in the file of this patent

UNITED STATES PATENTS

| 2,395,265 | Gresham | Feb. 1, 1946 |
| 2,625,569 | Gresham | Jan. 13, 1953 |

FOREIGN PATENTS

| 486,015 | Great Britain | May 27, 1938 |